Aug. 27, 1968 J. R. DOLL 3,399,323

COLOR CONTROL SYSTEM FOR A TELEVISION PICTURE TUBE

Filed Jan. 6, 1966 3 Sheets-Sheet 1

INVENTOR.
JOHN R. DOLL
BY Glenn B. [signature]
Atty.

COLOR CONTROL SYSTEM FOR A TELEVISION PICTURE TUBE

Filed Jan. 6, 1966 3 Sheets-Sheet 2

INVENTOR.
JOHN R. DOLL
BY

COLOR CONTROL SYSTEM FOR A TELEVISION PICTURE TUBE

Filed Jan. 6, 1966 3 Sheets-Sheet 3

INVENTOR.
JOHN R. DOLL
BY [signature]
ATTY.

United States Patent Office 3,399,323
Patented Aug. 27, 1968

3,399,323

COLOR CONTROL SYSTEM FOR A TELEVISION PICTURE TUBE

John R. Doll, 625 Windsor Terrace SE., Grand Rapids, Mich. 49503

Filed Jan. 6, 1966, Ser. No. 519,062
3 Claims. (Cl. 315—18)

This invention relates to the construction of color television picture tubes. The invention primarily concerns the color-control grid arrangement, and the associated arrangement of color responsive areas on the screen. In the preferred form of the invention, the focusing of the electron beam is accomplished by the color-control grid system as an added function. Directional control of the electron beam to impinge on selected color areas on the screen is not a broadly new concept. This principle is discussed in the following U.S. Patents: Lawrence, 2,692,532, 1954; Sandor, 2,860,271, 1958; Kruper et al., 2,862,141, 1958; Miller, 2,879,325, 1959; Loughlin, 2,885,465, 1959; Dorr, 2,906,813, 1959.

The present invention provides an arrangement of color-responsive areas on the screen in sectors surrounding origins, with the axis of focused beams impinging on the origins to produce white light. The diameter of the beam will result in the impingement area extending out into the surrounding color-responsive areas by an approximately equal amount; and if these areas correspond to the primary colors of red, blue and green, the result is a substantially white light. As the axis of the beam is diverted by the grid system, the effect is to displace the beam laterally to fall more on a certain sector or sectors than on others, thus emphasing the colors associated with those sectors. A single electron "gun" can thus be used at full intensity, regardless of the color being displayed.

The several features of the invention will be analyzed in detail through a discussion of the particular embodiment illustrated in the accompanying drawings. In the drawings.

Figure 1:
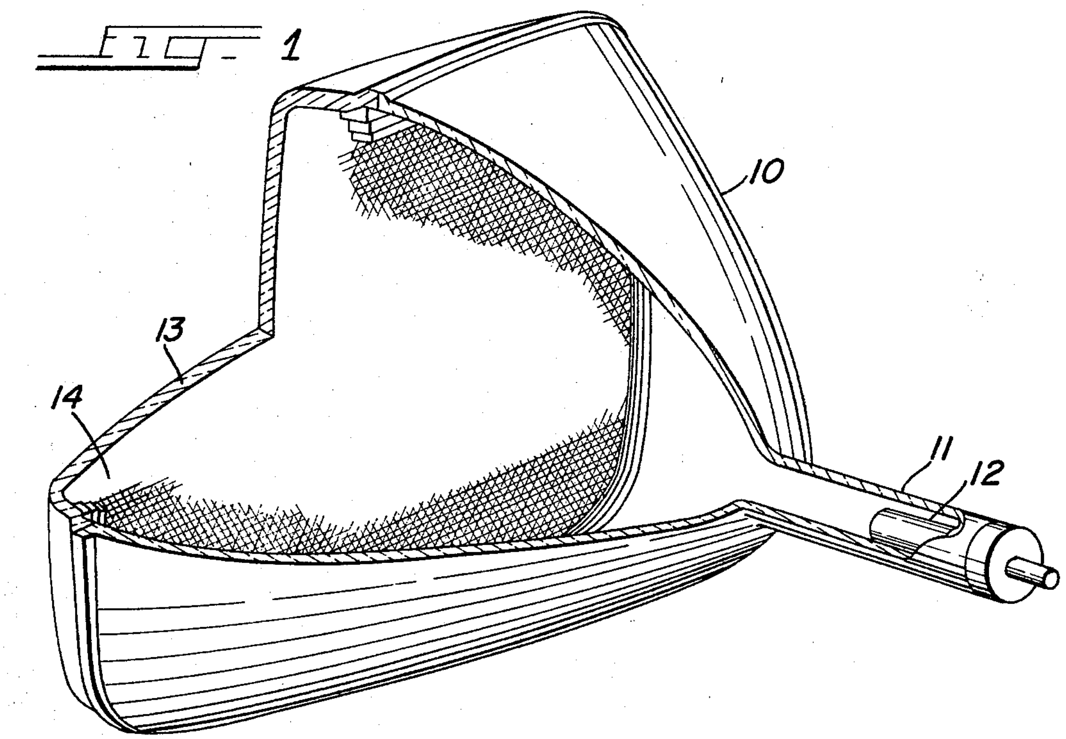
FIGURE 1 is a perspective view of a television picture tube, with a portion cut away to show in schematic arrangement the general position of the grid system utilized by this invention.
Figure 2:
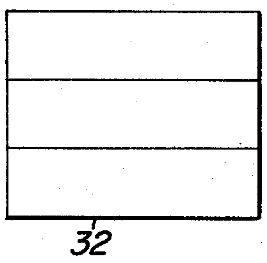
FIGURE 2 is a schematic view on an enlarged scale over that of FIGURE 1; showing a grid corresponding to one particular color.
Figure 3:
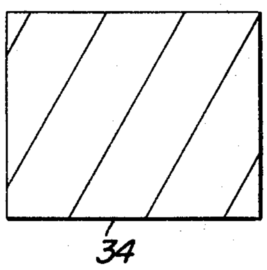
FIGURE 3 illustrates a grid of parallel wires similar to that of FIGURE 2, but representing a different color, and with the wires in an angular relationship with respect to those of FIGURE 2.
Figure 4:
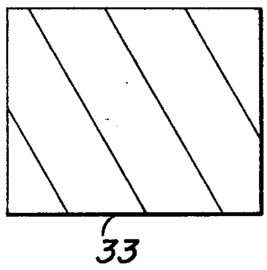
FIGURE 4 is a further schematic diagram showing a grid of parallel wires associated with the third primary color.
Figure 5:
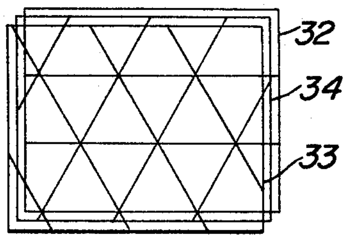
FIGURE 5 illustrates the overlaid relationship of the grids shown in FIGURES 2, 3, and 4.
Figure 6:
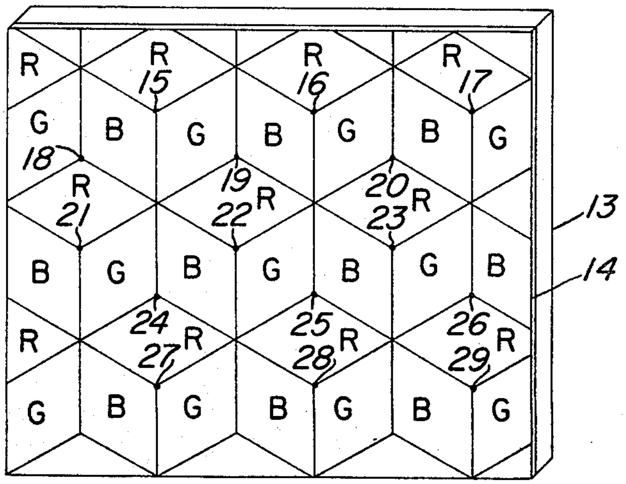
FIGURE 6 illustrates the arrangement of color-responsive areas on the screen.
Figure 10:
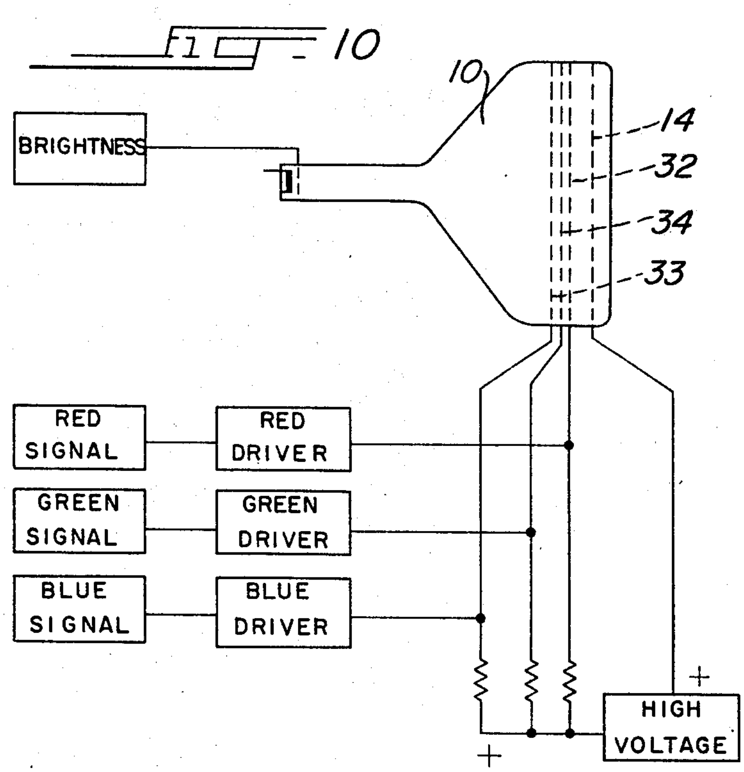
FIGURE 10 is a block circuit diagram showing the interrelationship of the components of the color-control system.
Figures 7, 8, 9:
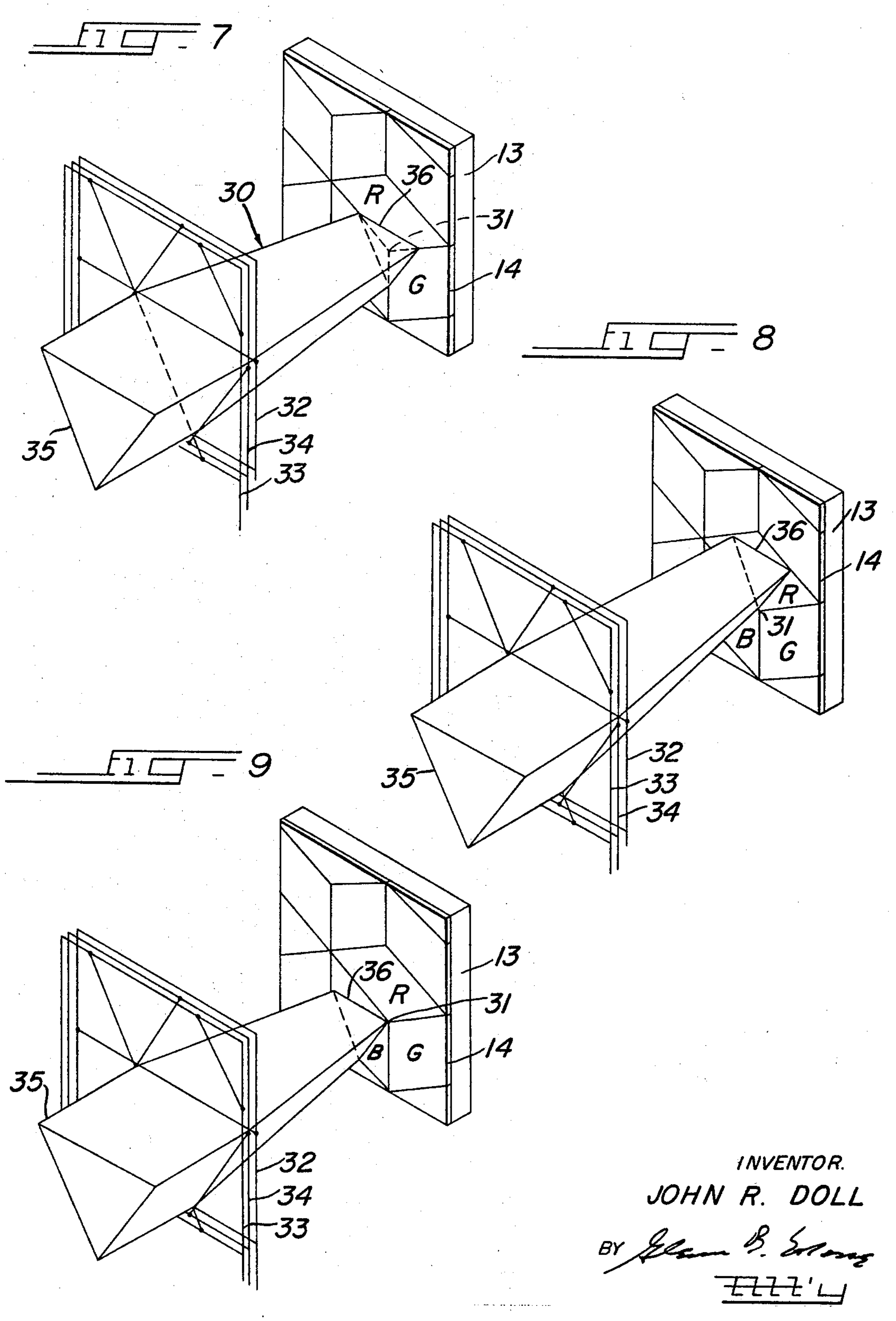
FIGURE 7 illustrates a segment of an electron beam as it traverses the triangular opening between the grid wires shown in FIGURE 5, and impinges on the screen with its axis on the origin of one of the groups of color-responsive areas.
FIGURE 8 is a schematic diagram similar to FIGURE 7, showing the displacement of the beam to emphasize a particular color.
FIGURE 9 is a view similar to FIGURE 8, but showing a displacement of the beam to emphasize another color.

Referring to FIGURE 1, the illustrated television picture tube includes the funnel-shaped glass body 10 with the tubular stem 11 containing the electron-emission and scanning unit 12. This may be of conventional design, and will not be described here in detail. The glass front 13 of the tube is provided (on or adjacent to its inside surface) with the screen 14 of material responsive to the beam of electrons projected by the emission device 12. The particular materials of which the screen 14 is made are well-known in the art, and certain of these are responsive to the electron beam to produce particular colors. The surface of the screen 14 is divided into groups of color areas as best shown in FIGURE 6. These color areas are arranged in groups of the three primary colors around the origins 15–29, with each color area occupying a sector of approximately 120 degrees with respect to each origin. The primary additive colors of red, green, and blue are arranged as shown in FIGURE 6 so that the adjacent groups will share an area between them, with the exception of the marginal areas surrounding the screen. The position of these groups is closely related to the arrangement of the grid system shown in FIGURES 2 through 5. The grid system includes three sets of parallel wires, with the sets being insulated and angularly displaced with respect to each other. The horizontal group of grid wires shown in FIGURE 2 may be associated with the color red, the arrangement upward and to the right as shown in FIGURE 3 may be associated with the green, and the upward to the left arrangement of FIGURE 4 with the color blue. When these are overlaid as shown in FIGURE 5, they define triangular openings between them through which the total electron beam is projected. If a beam of electrons is considered as overlapping several of the openings shown in FIGURE 5, one of the functions of the grid system is to serve as a means of focusing this relatively large beam into a group of smaller beams. Biasing applied to the grids of a negative nature will tend to deflect the electrons which pass in the immediate vicinity of the wires. This produces a convergence of the beam that would initially occupy the full triangular opening into a smaller beam of similar cross section. The grids and the color groups of the screen 14 are so arranged that the origins 15–29 are disposed substantially on a straight line from the emission device through the centers of the triangular openings shown in FIGURE 5. The constant biasing effect on the grids will produce the focusing effect shown in FIGURE 7. When white light is to be shown on the screen, the focused beam 30 will be permitted to fall with its axis directly on the origin 31. The substantially equal biasing effect of the grids 32–34 will maintain the axis of the beam 30 on a relatively straight line from the emission device, although the relatively large beam (of which the portion 35 is merely the part impinging on one of the triangular openings defined by the grids) is now broken up into a series of intensified points of focus at the screen 14. If the biasing of one of the grids is altered with respect to the others by the driver circuit, the effect will be to bend the axis of the beam 30 so that the focused area 36 drifts off from axial alignment with the origin 31 so that it rests more in one color area than in the others. If the degree of bias on the horizontal "red" grid 32 is reduced, the effect will be to decrease the displacement of the paths of the individual electrons so that the entire beam drifts toward the red area of the screen 14 associated with the origin 31. In FIGURE 9, alteration of the bias on the "green" grid results in displacement of the focused impact area 36 into the green area. While FIGURES 8 and 9 show complete displacement to produce a solid color, partial displacement will result in emphasis of that particular primary color to produce the varying colors of the picture being displayed. It should be noted here that the particular area being scanned at the moment is receiving the full beam from the electron device 12 without substantial attenuation. An effect similar to that described above can be produced by using a constant bias on the grids 32–34, together with a color control that produces a wobbling effect of the electron beam at some point between emitting device 12 and the grids 32–34. Such an arrangement must provide for a system which would amount to a pivoting action of the beam segments about the centers of the triangular openings defined by the grids 32–34. It should also be noted that the presence of three grids will result in the capability of rotating the impact area 36 about a full circle and consequently the grid system may be used in conjunction with color-responsive groups containing more than three sectors. The net effect of the color-control system described above is to provide a maximum color intensity for a given cost committed to the emitting device and to circuitry related to the control system. The use of a group of guns (one for each of the primary colors used) becomes totally unnecessary with this arrangement. The readiness with which the color control can be combined with the focusing, while not in itself a new development, illustrates the manner in which this type of color control can be incorporated in a television installation to produce the optimum characteristics for a given cost.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a color television picture tube having components which include electron beam-emission means and a screen, a color control system comprising:

at least three overlaid sets of parallel grid wires disposed in planes transverse to the path of said beam, and between said emission means and said screen, said sets extending in planes angularly displaced with respect to each other to produce a plurality of triangular openings between said grid wires normally traversed intermittently by said beam;

color-response material mounted on said screen according to a pattern in which groups of at least three primary color areas are arranged in sectors about an origin, each of said sectors containing a particular color response material, and said groups being arranged with respect to each other so that one of said areas is common to two adjacent groups, with the exception of marginal areas at the edge of said screen, said origins being disposed on a line extending from said emission means through the central area of said triangular openings; and circuit means connected to each of said sets of grid wires to bias the same in response to received signals.

2. A combination as defined in claim 1, wherein said sets of grid wires are displaced from each other by substantially one hundred and twenty degrees.

3. A combination as defined in claim 1, wherein said areas each occupy a sector of one hundred and twenty degrees about the origins associated therewith.

References Cited

UNITED STATES PATENTS

| | | | |
|---|---|---|---|
| 2,602,145 | 7/1952 | Law | 315—21 X |
| 2,837,689 | 6/1958 | Dufour | 315—14 |
| 2,899,579 | 8/1959 | Geer | 313—81 |

RODNEY D. BENNETT, *Primary Examiner.*

M. F. HUBLER, *Assistant Examiner.*